US012695349B2

(12) United States Patent
Baudey et al.

(10) Patent No.: US 12,695,349 B2
(45) Date of Patent: Jul. 28, 2026

(54) SLOTLESS STATORS AND METHODS FOR MANUFACTURING SUCH STATORS

(71) Applicant: MAXON INTERNATIONAL AG, Sachseln (CH)

(72) Inventors: Julien Baudey, Bonneville (FR); Jens Schulze, Giswil (CH); Andreas Stadelmann, Neudorf (CH)

(73) Assignee: MAXON INTERNATIONAL AG, Sachseln (CH)

( * ) Notice: Subject to any disclaimer, the term of this patent is extended or adjusted under 35 U.S.C. 154(b) by 121 days.

(21) Appl. No.: 18/579,714

(22) PCT Filed: Jul. 13, 2022

(86) PCT No.: PCT/EP2022/069694
§ 371 (c)(1),
(2) Date: Jan. 16, 2024

(87) PCT Pub. No.: WO2023/285574
PCT Pub. Date: Jan. 19, 2023

(65) Prior Publication Data
US 2024/0333065 A1 Oct. 3, 2024

(30) Foreign Application Priority Data

Jul. 16, 2021 (EP) .................................... 21186263

(51) Int. Cl.
*H02K 3/47* (2006.01)
*H02K 1/12* (2006.01)
(Continued)

(52) U.S. Cl.
CPC ................. *H02K 3/47* (2013.01); *H02K 1/12* (2013.01); *H02K 3/28* (2013.01); *H02K 15/02* (2013.01);
(Continued)

(58) Field of Classification Search
CPC .. H02K 1/12; H02K 3/28; H02K 3/47; H02K 15/02; H02K 15/08; H02K 15/12; H02K 15/24; H02K 2213/03
(Continued)

(56) References Cited

U.S. PATENT DOCUMENTS 2,967,672 A 1/1961 Zwayer
4,703,211 A 10/1987 Yazaki et al.
(Continued)

FOREIGN PATENT DOCUMENTS

CN 201122890 Y 9/2008
CN 101553667 A 10/2009
(Continued)

OTHER PUBLICATIONS

International Search Report and Written Opinion for Application No. PCT/EP2022/069694, mailed date Oct. 4, 2022, 14 pages.
(Continued)

*Primary Examiner* — Rashad H Johnson
(74) *Attorney, Agent, or Firm* — Mannava & Kang, P.C.

(57) ABSTRACT

A stator (2) for use in a slotless electric motor (1), particularly an electronically commutated motor, has a winding body (21) in the form of a hollow cylinder, consisting of three or more coils (26), and having a working section (15) located between two winding heads (23, 23') at two longitudinal ends of the winding body (21), and a cylindrical stator lamination stack (22), close-fittingly encompassing said working section (15) of the winding body (21). The two winding heads (23) consist of the longitudinal ends (28) of the three or more coils (26). They positively lock the stator lamination stack (22) along a longitudinal axis (19) of the winding body (21). The two winding heads (23) have the shape of a circular flange with an inner radius ($r_{wh}$) essen-
(Continued)

(a)

15 tially equal to an inner radius ($r_{ws}$) of the working section (15) of the winding body (21).

19 Claims, 7 Drawing Sheets

(51) Int. Cl.

| | |
|---|---|
| *H02K 3/28* | (2006.01) |
| *H02K 15/02* | (2006.01) |
| *H02K 15/08* | (2006.01) |
| *H02K 15/12* | (2006.01) |
| *H02K 15/24* | (2025.01) |

(52) U.S. Cl.
CPC ............. *H02K 15/08* (2013.01); *H02K 15/12* (2013.01); *H02K 15/24* (2025.01); *H02K 2213/03* (2013.01)

(58) Field of Classification Search
USPC .......................................................... 310/179
See application file for complete search history.

(56) References Cited

U.S. PATENT DOCUMENTS

| | | | | |
|---|---|---|---|---|
| 4,837,921 | A | 6/1989 | Tassinario | |
| 5,525,850 | A | 6/1996 | Stinson | |
| 6,525,437 | B1 | 2/2003 | Ozawa et al. | |
| 7,078,843 | B2 * | 7/2006 | Du | H02K 3/325 |
| | | | | 310/216.091 |
| 7,164,218 | B2 * | 1/2007 | Kimura | F04C 23/008 |
| | | | | 310/58 |
| 7,240,515 | B2 * | 7/2007 | Conry | F04D 25/06 |
| | | | | 62/510 |
| 7,338,262 | B2 * | 3/2008 | Gozdawa | F04D 29/5806 |
| | | | | 417/423.12 |
| 7,923,871 | B2 * | 4/2011 | Weiss | H02K 9/08 |
| | | | | 310/58 |
| 9,470,238 | B2 * | 10/2016 | Vande Sande | H02K 3/00 |
| 10,312,776 | B2 | 6/2019 | Tassinario et al. | |
| 11,632,022 | B1 * | 4/2023 | Norollahisomarin | H02K 5/148 |
| | | | | 310/128 |
| 11,967,870 | B2 * | 4/2024 | Andrieux | H02K 1/12 |

| | | | | |
|---|---|---|---|---|
| 2003/0038555 | A1 * | 2/2003 | Ozawa | H02K 15/061 |
| | | | | 310/154.02 |
| 2007/0018516 | A1 * | 1/2007 | Pal | F04D 25/082 |
| | | | | 310/58 |
| 2007/0103025 | A1 | 5/2007 | Rohrer et al. | |
| 2007/0228847 | A1 * | 10/2007 | Kim | H02K 9/06 |
| | | | | 310/156.28 |
| 2007/0236094 | A1 * | 10/2007 | Kaminski | H02K 5/128 |
| | | | | 310/156.43 |
| 2008/0253907 | A1 * | 10/2008 | Lind | F04D 29/05 |
| | | | | 277/306 |
| 2010/0090558 | A1 | 4/2010 | Suzuki et al. | |
| 2012/0080975 | A1 | 4/2012 | Baudey et al. | |
| 2012/0153762 | A1 | 6/2012 | Tassinario et al. | |
| 2016/0036277 | A1 * | 2/2016 | Lynch | H02K 3/345 |
| | | | | 264/104 |
| 2019/0103779 | A1 | 4/2019 | Montagnat-Rentier et al. | |
| 2024/0275221 | A1 * | 8/2024 | Beyerl | H02K 3/28 |
| 2024/0333065 | A1 * | 10/2024 | Baudey | H02K 3/47 |

FOREIGN PATENT DOCUMENTS

| | | |
|---|---|---|
| CN | 212210635 U | 12/2020 |
| DE | 1613428 A1 | 1/1971 |
| EP | 3468007 A1 | 4/2019 |
| EP | 3216112 A1 | 5/2021 |
| JP | H01252135 A | 10/1989 |
| JP | 3998099 B2 | 8/2007 |
| JP | 2007202400 A | 8/2007 |

OTHER PUBLICATIONS

European Patent Office, "Communication pursuant to Rule 114(2) EPC for EP Application No. 22747028.3", dated Jan. 23, 2026, 20 pages.

English translation of Notice of Facts Regarding Information Provision from the Intellectual Property Office for Korean Patent Application No. 10-2024-7000977, Mar. 5, 2026, 2 pages.

European Patent Office, "Communication pursuant to Rule 114(2) EPC for EP Application No. 22747028.3", dated Apr. 2, 2026, 12 pages.

German Patent and Trademark Office, "Including machine English translation of Third Party Submission of the Cancellation Request of the German utility model DE 20 2022 003 314 U1 (Mannex GM1)", dated Mar. 11, 2026, 50 pages.

\* cited by examiner (a)

(b)

(a)

(b)

(c)

(a)

(b)

(c)

(d)

(e)

SLOTLESS STATORS AND METHODS FOR MANUFACTURING SUCH STATORS

CLAIM FOR PRIORITY

The present application is a national stage filing under 35 U.S.C 371 of PCT application number PCT/EP2022/069694, having an international filing date of Jul. 13, 2022, which claims priority to EP patent application Ser. No. 21/186,263.6 having a filing date of Jul. 16, 2021, the disclosures of which are hereby incorporated by reference in their entireties.

FIELD OF THE INVENTION

The invention relates to stators for slotless electric motors, to slotless electric motors with such stators, to tools for manufacturing such stators, and to methods for manufacturing such stators.

BACKGROUND OF THE INVENTION

Different approaches have been taken to achieve a more compact design of slotless electric motors, particularly of electronically commutated (EC) electric motors, also known as brushless direct current (BLDC) electric motors.

In miniaturized EC motors, the stator comprises a hollow-cylindrical winding that is arranged inside an aligned cylindrical back iron (also known as slotless core), instead of coils mounted in a slotted iron core. Like a much bulkier slotted iron core, a cylindrical back iron forms a return path of the magnetic flux generated by the coils, thereby increasing the magnetic flux and as a result the torque of the electric motor.

US 2007/0103025 A1 discloses an air-cored cylindrical winding for use in rotors of permanently excited direct current (DC) electric motors, or in stators of EC motors. The cylindrical winding is composed of a plurality of separate rhombically shaped coils that overlap each other, forming a cylindrical imbricate structure. The rhombic shape of the flat coils allows to build the cylindrical winding without bulky winding heads, thereby reducing the overall volume of the motor. Furthermore, the cylindrical winding can be slidably inserted into the cylindrical back iron. However, the rhombical shape of the coil wires reduces the achievable torque.

U.S. Pat. No. 6,525,437 B1 discloses an oil cooled electric motor, in which a cylindrical stator winding with imbricately arranged rhombic coils is compressed during the assembly of the two back iron halves. The two axial ends of the cylindrical winding protruding from the assembled cylindrical back iron are not compressed, as a result retain a larger diameter.

U.S. Pat. No. 5,525,850 discloses a stator for use in a BLDC motor, having a cylindrical winding with axially oriented coils, arranged in a cylindrical back iron. For manufacturing the cylindrical winding, a winding collar with radially projecting winding teeth is aligned with an inner winding sleeve. A cylindrical winding tool temporarily mounted inside the inner winding sleeve and the winding collar, with winding pins axially projecting from the inner sleeve. The coils are then wound on the winding teeth and the winding pins, with the electrical conductors parallel to the rotor axis. At the two longitudinal winding heads, the wires are wound back after an angular displacement, to provide a uniform interior diameter along the length of the cylindrical stator. After all winding has been completed, an outer sleeve is placed on the winding, and the winding tool is retracted. A plurality of ring-shaped iron plates is mounted on the outer sleeve, thereby forming a cylindrical back iron. The winding head with the winding collar axially protrudes from the cylindrical back iron, resulting in an increased overall length and volume of the motor, while at the same time not adding to the overall performance of the motor.

US 2012/0080975 A1 and US 2019/0103779 A1 disclose an axial self-supported cylindrical winding for a stator with cylindrical back iron, for use in a BLDC motor. The winding includes a cylindrical coil body formed by wound electrical conductors. The electrical conductors in the cylindrical coil body are substantially parallel to the rotor axis. On one longitudinal end of the cylindrical winding, the winding head extends radially outwards from the outer surface of the cylindrical coil body. On the other end of the cylindrical winding, the winding head extends radially inwards from the inner surface of the coil body. Such a design reduces the axial length of the winding heads and allows to slidably insert the cylindrical winding into a cylindrical back iron during assembly. On the other hand, the winding head projecting inwards blocks the volume inside the cylindrical winding adjacent to the rotor, so that a rotor shaft bearing on this end of the winding has to be placed further outwards. This increases the overall length and volume of the motor, and thus neutralizes the length reduction of the winding head on this end.

U.S. Pat. No. 4,837,921 describes a manufacturing method of a stator with cylindrical winding and cylindrical back iron. A cylindrical winding is formed, of which the turns of the coils situated at the edges of the cylinder are then bent back towards. The winding is placed in an injection mould, and liquid polymer is injected. After cooling and subsequent removal of the resulting spool-shaped rigid winding unit from the mould, iron wire is wound up on the spool, thereby forming the cylindrical back iron. The steps of winding the coils, injection moulding, and winding up the iron wire have to be carried out on different tools, which makes such a manufacturing process slow and expensive.

US 2012/0153762 A1 discloses another method for manufacturing a stator with cylindrical winding and cylindrical back iron. To avoid bulky winding heads, the coils are wound in such a way that the coil cross-section in the winding head has the form of a triangle. The winding heads of the winding can then be axially compressed and deformed, resulting in a completely cylindrical winding body without radially protruding winding heads.

There is a general need for improvements in this field.

SUMMARY OF THE INVENTION

It is an object of this invention to provide advantageous stators for use in slotless EC electric motors, and slotless electric motors having such stators, that overcome one or more of the afore-mentioned and other problems, and particularly allow for further reduction of the volume of electric motors. Such stators and electric motors should be reliable and cost efficient in large scale manufacture.

It is another object to provide an advantageous method for manufacturing stators for slotless EC electric motors.

These and other objects are substantially achieved by a stator, a slotless electric motor, a tool, and a manufacturing method according to the independent claims. Further advantageous embodiments are set forth in the dependent claims and the description.

A first aspect of the invention concerns a stator for use in a slotless electric motor, particularly an electronically commutated motor, with a winding body in the form of a hollow cylinder, consisting of three or more coils, and having a working section located between two winding heads at two longitudinal ends of the winding body, and with a cylindrical stator lamination stack or back iron, close-fittingly encompassing said working section of the winding body. The two winding heads consist of the longitudinal ends of the three or more coils and positively lock the stator lamination stack along a longitudinal axis of the winding body by form-fit. The two winding heads have the shape of a circular flange with an inner radius essentially or almost equal to an inner radius of the working section of the winding body.

Since none of the winding heads has an inner diameter smaller than the inner diameter of the working section of the winding body, there are no restrictions regarding the insertion of the rotor into the stator during assembly. Furthermore, the inner volume of the winding heads is sufficient for placing a bearing, e.g. a ball bearing, of the rotor shaft and/or an encoder element, e.g. an encoder magnet, within a winding head. This allows a compact design of an electric motor with such a stator.

In an advantageous embodiment of such a stator, the two winding heads of the winding body have an outer radius essentially or almost equal to an outer radius of the stator lamination stack.

The outer radius of the winding heads is advantageously more than 95% of the outer radius of the of the stator lamination stack. More advantageously, the outer radius of the winding heads is more than 97% of the outer radius of the stator lamination stack.

The resulting stator has an overall shape of a hollow cylinder, which allows an even compacter design of an electric motor with such a stator.

The stator may simply be enclosed by a casing and the stator in the casing comprising as much wire for the coils as it is possible.

Advantageously, in such a stator a longitudinal front face of the two winding heads facing outward is oriented perpendicular to the longitudinal axis of the winding body.

Such a planar flat front face of the winding heads, and thus of the whole stator, minimizes the building volume of an electric motor with such a stator. Since the winding heads do not add to the magnetic field acting on the magnets of the rotor, such a measure has no negative effect on the power output of the electric motor.

The coils forming the winding body of such a stator are advantageously made with multistrand wire, particularly multi-strand copper wire.

Suitable multi-strand wire may typically comprise between 10 and 100, advantageously between 20 and 30 strands, each strand typically having a diameter between 0.05 mm and 0.2 mm.

In the context of the invention, multi-strand wire has the particular advantage that it can be more easily deformed than a single-strand wire with the same cross-section. In addition, stranded wire is better suited for high-speed EC motors, because the magnetic field in the wire produces less eddy current losses. Multi-strand wire with the mentioned number of strands and diameter has a good ratio between easily deformability and amount of copper. This allows further to wind a powerful motor while taking economic aspects into account during the winding process.

Advantageously, the connecting wires of the different coils protrude in an axial direction in the middle of a longitudinal front face of the winding heads. This allows to easily connect the connecting wires to a circuit board.

The provided stator lamination stack is advantageously in regard to energy efficiency and heat production made from a stack of insulated sheet metal of a suitable ferromagnetic material. A stack of insulated metal sheets reduces eddy currents in the stator lamination. The metal sheets can be held together adhesively, or by positive or form-fit locking. The metal sheets may also be held without additional fastener only by the two winding heads.

The stator can comprise 2 to 20 winding turns for each coil, advantageously between 4 and 8 winding turns for each coil. A small number of winding turns can be produced more cost efficient.

The stator can have an inner radius between 4 mm and 10 mm, advantageously between 6 mm and 8 mm. The stator lamination stack may have an outer radius between 5 mm and 15 mm, advantageously between 10 mm and 12 mm.

The stator can be provided with an integrated temperature sensor. The temperature sensor can be located between the stator lamination stack and either the winding head or the working section of the winding body.

The temperature sensor may measure the temperature of the stator at a point where the measured temperature is expected to best reflect the copper wire temperature during the operation of the motor. A controller may adjust the power of the motor based on the measured temperature of the sensor.

Such a temperature sensor is advantageously mounted in the stator, before or during the winding process that will be described further below.

The stator lamination stack as a back iron can generate a higher magnetic flux density.

The magnetic flux density depends on the material of the stator lamination stack, the mechanical and geometric dimensioning of the stator lamination stack, as well as the electrical operating parameters such as current, voltage and the frequency of the motor during operation. The magnetic flux density may lie between 1 and 3 Tesla.

In an advantageous embodiment of a stator as described, the ratio $(R_{wh}-r_{wh})/L_{wh}$ of the thickness of a winding head (the difference $R_{wh}-r_{wh}$ between an outer radius of a winding head and an inner radius of said winding head), and the axial length $L_{wh}$ of said winding head lies between 0.5 and 1.

Additionally, or alternatively, in an advantageous embodiment of a stator, the ratio $(R_{sls}-r_{sls})/L_{wh}$ of the thickness of the stator lamination stack (the difference $R_{sls}-r_{sls}$ between an outer radius and an inner radius of said stator lamination stack) and the length $L_{wh}$ of each of the winding heads lies between 0.2 and 0.7, advantageously between 0.35 and 0.6.

A second aspect of the invention concerns a slotless electric motor, particularly an electronically commutated motor, with an external cylindrical stator according to the invention and a rotor arranged within the interior compartment of said stator.

In an advantageous embodiment of such an electric motor a bearing and/or an encoder element and/or elements for the balancing of the rotor are located at least partially within a winding head of the stator.

Such a positioning of bearings and/or encoder elements, e.g. an encoder magnet, and/or a balancing element of the rotor, are positioned on a longitudinal axis at least partly within the winding head of the stator is possible because none of the winding heads has an inner diameter smaller than the inner diameter of the working section of the winding body. Since more parts can be placed inside the stator, a compact design of an electric motor can be achieved. The bearings and/or encoder elements and/or balancing element of the rotor may be positioned on a shaft of the rotor, the shaft extending along a central, longitudinal axis of the rotor.

The different elements of the electric motor can be arranged in a casing, for example a cylindrical casing. The casing advantageously is made of metal and is in heat conducting contact with the stator in order to act as a heat sink for heat energy produced during the operation of the motor.

A third aspect of the invention concerns a tool for manufacturing a stator for use in a slotless electric motor, particularly an electronically commutated motor, having a tool body with a central bore and a multitude of hook pins. Said hook pins can be moved between a first, operative configuration and a second, retracted configuration. In said operative configuration of the hook pins, the inner ends of the hook pins protrude into the central bore of the tool body. In said retracted configuration of the hook pins, the inner ends of the hook pins are retracted, such that the distance of the inner ends of the hook pins from the longitudinal axis is larger than in the operative configuration.

As the hook pins can be moved between the operative position in which the wire can be wound up on the hook pins to form the coils and the retracted position in which the hook pins do not support the coils anymore, it is possible to carry out a compression and form shaping of the longitudinal end of the coils that protrude from the stator lamination stack without the need to transfer the partially finalized stator to another tool. This makes the manufacturing of the stators quicker and thus more efficient and leads to a quick and efficient manufacturing process.

The tool can comprise two tool bodies which are to be arranged on both longitudinal ends of the stator lamination stack.

An advantageous embodiment of such a manufacturing tool can comprise an alignment cylinder, in which the stator lamination stack can be positively locked in the radial direction.

The tool can comprise fixation means for temporarily mounting the stator lamination stack on the tool, for example clamps, retractable hooks or stoppers that can couple the stator lamination stack for example to the alignment cylinder. It is also possible to use magnetic holding means such as for example electromagnets or permanent magnets, which can interact with the ferromagnetic material of the stator lamination stack.

In a further advantageous embodiment of such a manufacturing tool, the multitude of hook pins is shiftably mounted in corresponding guiding channels in the tool body.

The movement of the multitude of hook pins can be guided by channels in the tool body.

The hook pins and the corresponding guiding channels advantageously have the shape of a section of a circle. This allows a shifting movement of the pins on a path that is aligned with its own curved form. This is advantageous because the hook pins use minimal space for their movement. The hook pins can also be linear, which is essentially the special case of a section of a circle with an infinitely large radius.

Additionally or alternatively, the multitude of hook pins can be pivotably mounted on the tool body.

The movement of each of the multitude of hook pins can be a pivoting movement each pin pivoting around an individual axis.

Moving the curved or linear hook pins in the guiding channels can be interpreted as a pivoting motion of the hook pins, with the pivotal point being identical to a virtual centre point of the circle of which the hook pin is a section of.

However, it is also possible to mount the pin on a pivotable suspension point or axis.

A further advantageous embodiment of such a tool can comprise a pressing tool with a pressing piston that allows to compress the part of the coils protruding from the stator lamination stack to a compact winding head having the form of a radially protruding flange that positively locks the stator lamination stack on the winding body by form-fit.

In such a tool, an alignment rod may be provided for aligning the pressing piston with the stator lamination stack.

A fourth aspect of the invention concerns a method for manufacturing a stator for use in a slotless electric motor, particularly an electronically commutated motor, comprising the steps:

providing a stator lamination stack of the stator, the stator lamination stack having the form of a hollow cylinder with an outer radius and a bore with an inner radius;

providing a multitude of hook pins on one or both longitudinal ends of said stator lamination stack in a first configuration, the multitude of hook pins protruding toward a longitudinal axis of the stator lamination stack, and the inner ends of said hook pins having a distance from said longitudinal axis that is smaller than the outer radius of the stator lamination stack;

winding three or more wire coils across the bore of the stator lamination stack, the individual wires inside the bore being oriented essentially parallel to the longitudinal axis, and the individual wires on the longitudinal ends of the coils outside the stator lamination stack being placed on the multitude of hook pins;

moving the multitude of hook pins in a second configuration in which said multitude of hook pins no longer support the individual wires;

axially compressing the wires on the longitudinal ends of the coils outside the stator lamination stack into a toroidally shaped winding head with an inner radius that is essentially equal to the inner radius of the coils inside the stator lamination stack.

After removal of the tool elements, the stator can be retrieved.

Optionally, insulation parts and layers can be paced between the different parts.

The winding can be carried out with a needle dispenser device, which accesses the pin hooks through the central bores of the tools and the inner bore of the stator lamination stack and places the wires in coils on the hook pins.

Advantageously, the compressing step of the wires on the longitudinal ends of the coils outside the stator lamination stack of the stator is carried out with a toroidal press mould formed by a longitudinal front face of the stator lamination stack and one or more tool elements.

In another advantageous variant of such a manufacturing method, the wires inside the stator lamination stack of the stator are radially compressed against the inner surface of the stator lamination stack.

Therefore, the inner radius of the stator is essentially uniformly cylindrical. As a result, a largest possible rotor may be inserted, with the smallest possible air gap remaining between the stator and rotor. Further, a high copper fill factor for the coil is achieved and the greatest possible magnetic flux can be generated in the stator lamination stack because of the smallest possible gap, respectively no gap, between the coils and the stator lamination stack.

Advantageously, wires coated with a heat curable prepolymer are used for winding the coils; and after winding the coils said prepolymer may be heat-cured.

The wires may be coated with a heat curable prepolymer or without a heat curable prepolymer. It is also possible to impregnate the windings or the coils with a polymer in the end of the manufacturing or the winding process.

In a particular advantageous variant of the manufacturing method, wires coated with a heat curable prepolymer are used for winding the coils; and after winding the coils and compressing the wires, said prepolymer is heat-cured, to form a mechanically stable winding body of the stator.

Advantageously, a manufacturing tool as discussed is applied in the manufacturing method.

BRIEF DESCRIPTION OF THE DRAWINGS

In order to facilitate a fuller understanding of the present invention, reference is now made to the appended drawings. These references should not be construed as limiting the present invention but are intended to be exemplary only. Components that are identical, or that are identical at least in terms of their function, are designated below by identical or at least comparable reference numbers.

DETAILED DESCRIPTION OF THE INVENTION

The examples provided hereinafter serve an improved illustration of the present invention but are not suited for restricting the invention to the features disclosed herein.

Figure 1:
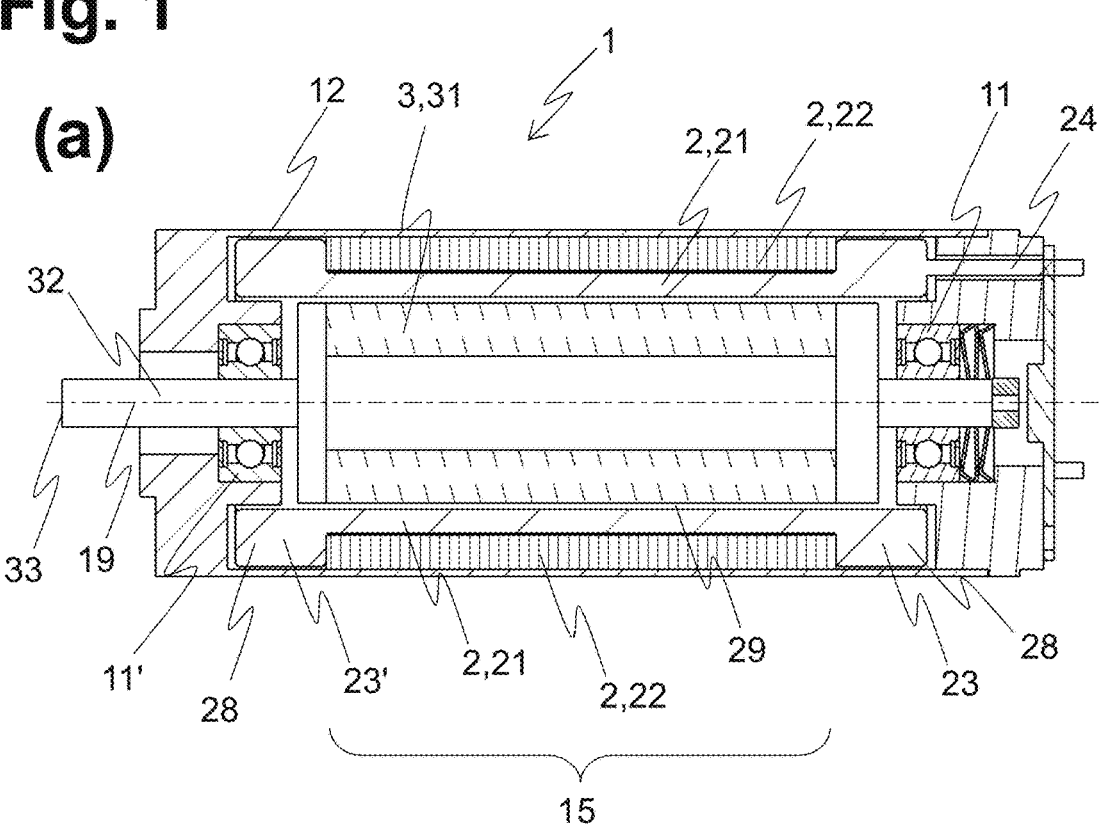
FIG. 1 shows two exemplary embodiments of a slotless electric motor according to the invention, in a cross-section along the longitudinal axis.
Figure 1:
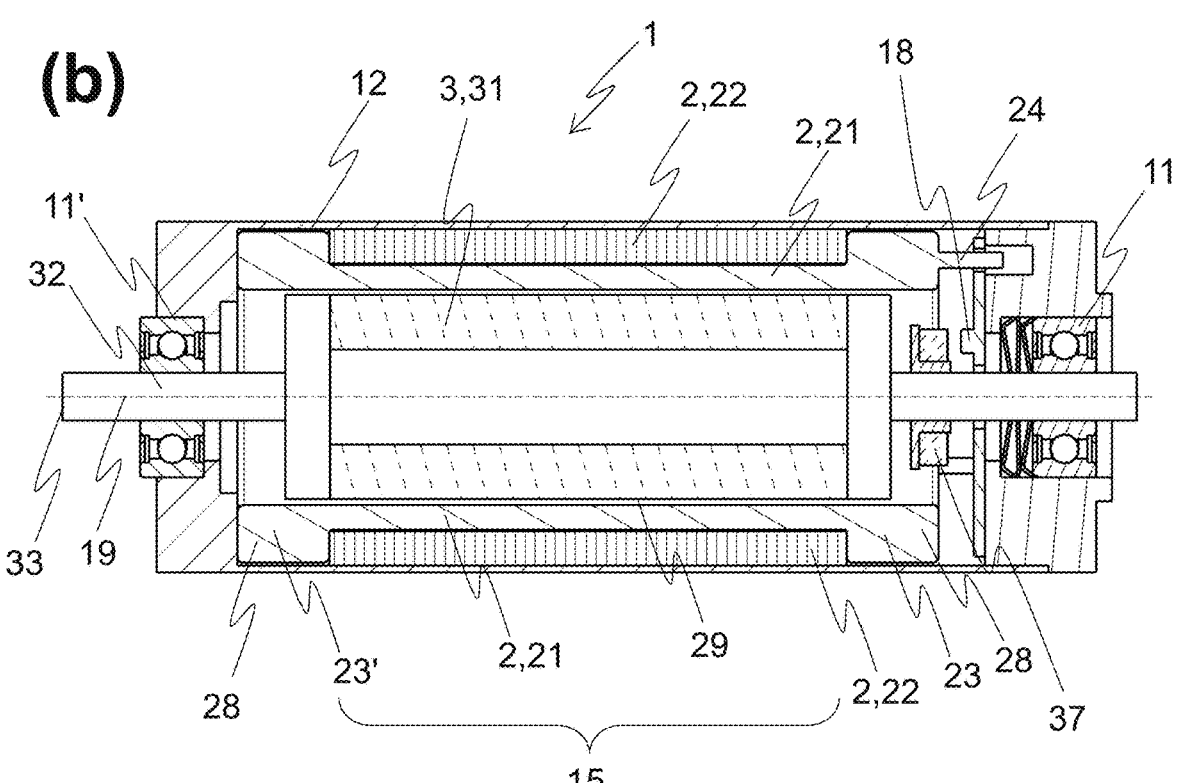

An advantageous slotless EC electric motor 1 is shown in FIG. 1(*a*). A stator 2 comprises a cylindrical winding body 21 consisting of three or more coils, e.g. three coils as shown in the figure. The winding body having a first winding head 23 on a first longitudinal end 28 of the winding body and a second winding head 23' on a second longitudinal end 28 of the winding body. The working section 15 of the stator 2, where the stator 2 and the rotor 3 of the electric motor 1 operatively interact, is located between the two winding heads 23, 23'. A cylindrical stator lamination stack 22 or back iron for concentrating or guiding the magnetic flux encompasses the winding body 21 in the working section 15. The stator lamination stack 22 can be realized as a stack of electrically isolated sheet metal rings made from a suitable ferromagnetic material such as electrical steel, in order to minimize power losses due to eddy currents.

A rotor 3 with permanent magnets 31 is arranged in the interior compartment 29 of the stator 2 in the working section 15 of the cylindrical winding body 21. The rotor 3 is fixed on a drive shaft 32 aligned to the longitudinal axis 19.

The drive shaft 32 is rotatably mounted on two ball bearings 11, 11'. One drive end 33 of the drive shaft 32 protrudes from the casing 12.

The components of the motor are arranged in a cylindrical casing 12. The stator 2 with winding body 21 and stator lamination stack 22 can be connected with the casing 12 with a suitable adhesive or a filler mass.

Since both of the two winding heads 23, 23' extend radially outwards, thereby positively or form-fittingly locking the stator lamination stack 22, the interior compartment 29 of the hollow-cylindrical winding body is cylindrical, having the same inner diameter along the longitudinal axis 19. As a result, the two bearings 11, 11' of the rotor 3, and/or other components such as encoder magnets or sensors, balance weights etc., can be arranged at least partially inside the interior compartment 29 of the stator, in the area of the two winding heads 23, 23'. This compact construction reduces the overall length of the motor 1. Such an advantageous EC electric motor provides a smaller motor volume without a reduction of the power output.

Another advantageous slotless EC electric motor 1 is shown in FIG. 1(*b*). While in general the structure of the electric motor 1 is similar to the embodiment discussed above, the two embodiments differ in a number of points. In the present embodiment, the shaft 32 of the rotor 3 protrudes from both sides of the casing 12. While the two ball bearings 11, 11' are arranged outside of the stator 2, a rotational encoder element 37, mounted on the shaft 32 and comprising for example magnets or optical markings, is compactly arranged inside the winding head 23. Said encoder elements can be read out by a suitable sensor element 18, for example a hall sensor or an optical sensor, for determining a rotation speed or an angular position of the rotor. The shown compact construction again reduces the overall length of the electric motor 1.

Figure 2:
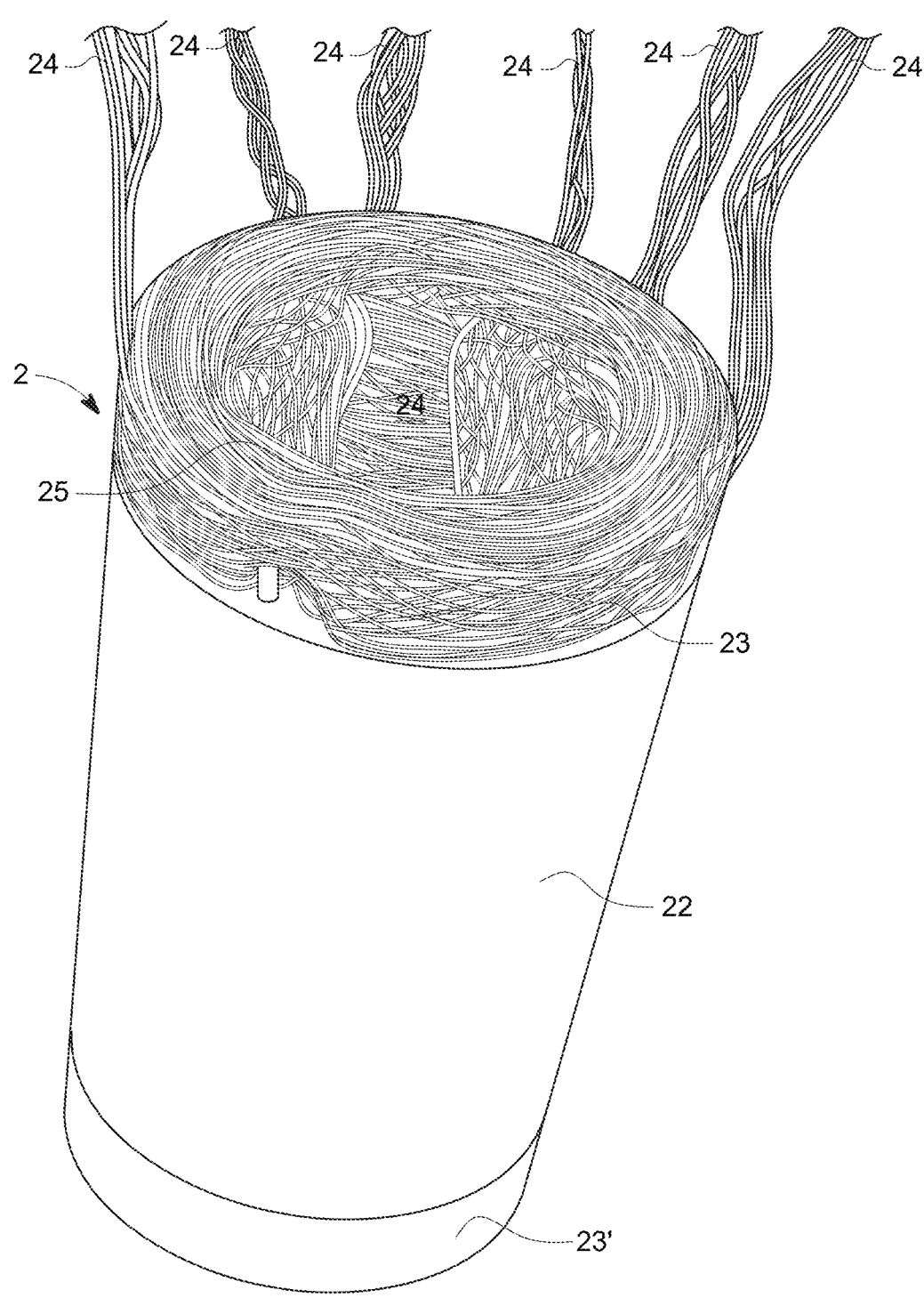
FIG. 2 shows a perspective view of an exemplary embodiment of a stator according to the invention.
Figure 3:
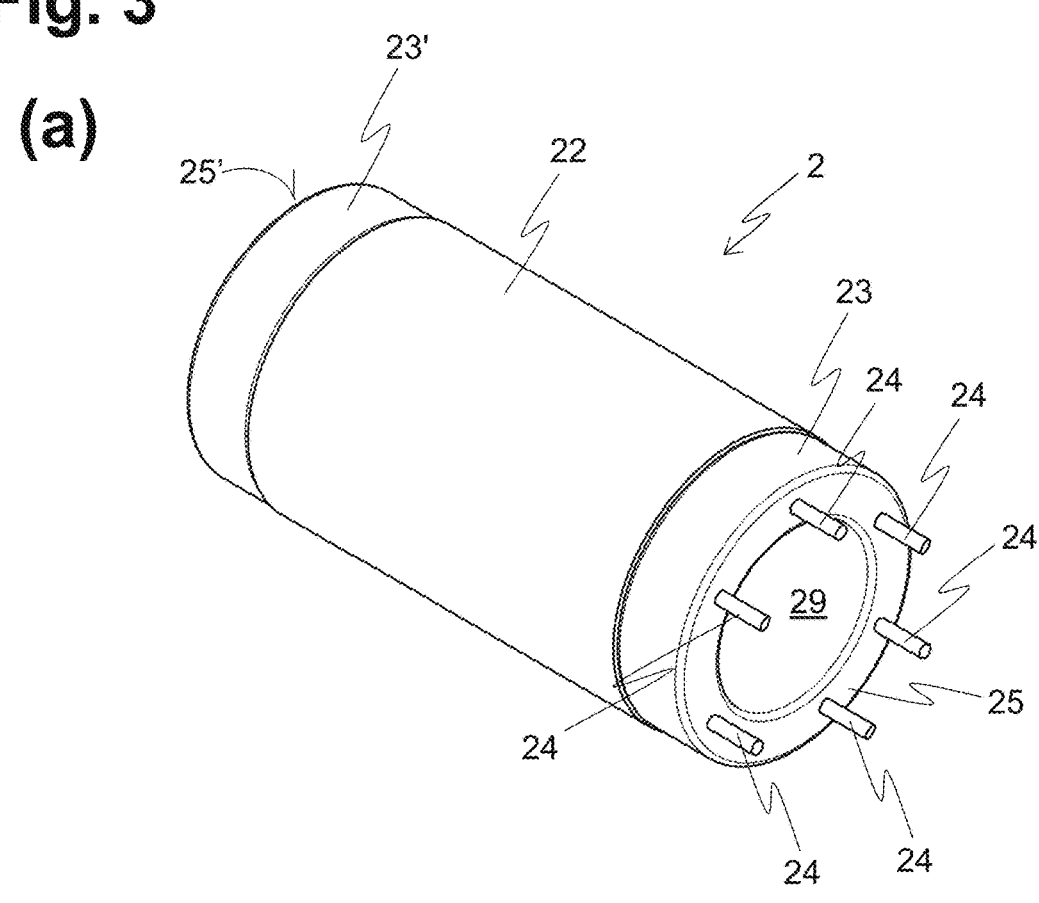
FIG. 3 shows an exemplary embodiment of a stator according to the invention, (a) in a perspective view; and (b) in a cross-section along the longitudinal axis.
Figure 3:
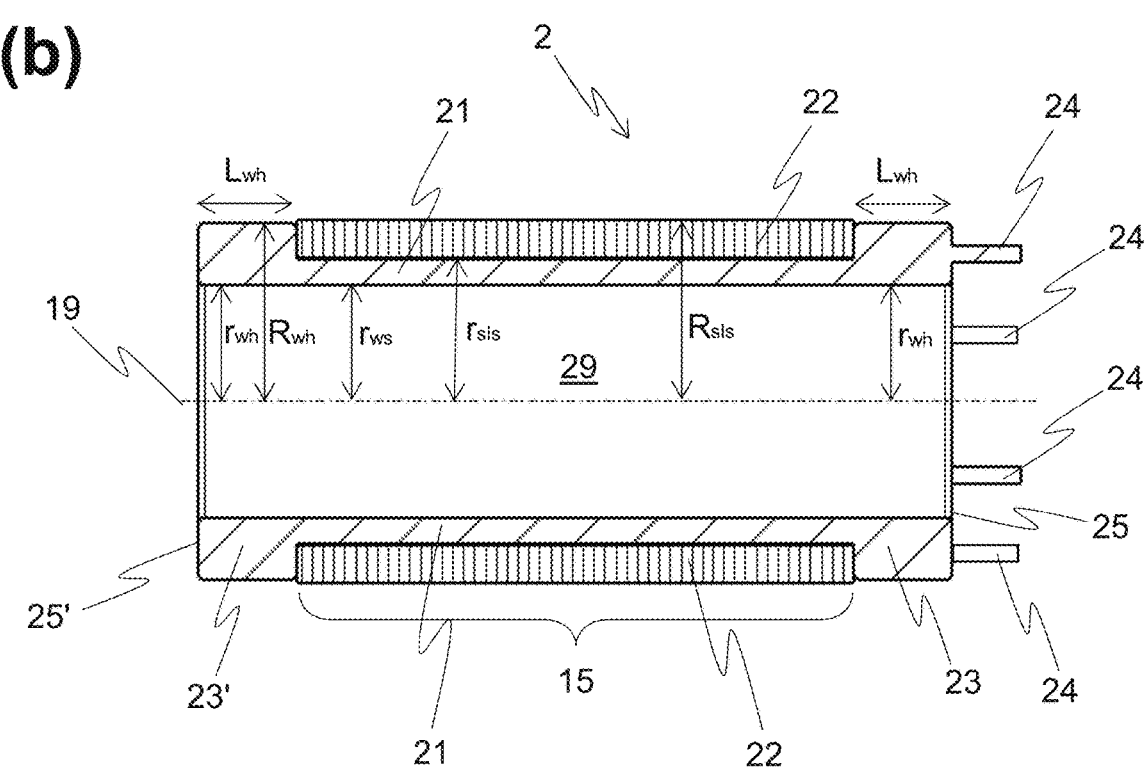

Two advantageous stators 2 that could be used in such an electric motor are shown in FIGS. 2 and 3. A stator lamination stack 22 encompasses a cylindrical winding body 21. There is no airgap or only a minimal gap or gap between the inner surface of the cylindrical stator lamination stack 22 and the outer surface of the cylindrical winding body 21 in the working section 15. Two winding heads 23, 23' of the winding body 21 are located at the two longitudinal ends of the stator lamination stack 22. The winding heads 23, 23' extend radially toward, almost up to the outer radius $R_{sls}$ of the stator lamination stack 22, thereby positively or form-fittingly locking the stator lamination stack 22.

The outer radius of the winding heads $R_{wh}$ is more than 95% of the outer radius of the $R_{sls}$ of the stator lamination stack. The outer radius of the winding heads $R_{wh}$ is advantageously more than 97% of the outer radius of the $R_{sls}$. The stator 2 has a cylindrical outer shape. The cylindrical interior compartment 29 of the cylindrical winding body 21 has an identical radius $r_{wh}$, $r_{ws}$ along the whole length of the winding body. The six connecting wires 24 of the different coils, which form together the winding body 21, protrude from the first winding head 23. The connecting wires 24 of the different coils may protrude in an axial direction radially positioned in the middle of a longitudinal front face 25, 25' of the winding heads 23, 23'.

Especially for motors with small diameters is the connection from the connecting wire to a printed circuit board sophisticating. The printed circuit board should not be larger than the diameter of the motor. The connecting wires should not be too close to the edge of the printed circuit board, so that a soldered connection is possible, and not too close to the casing so that an electrical contact is avoided. On the other hand, the connecting wires should not be too close to the axis so that sufficient distance between the individual phases can be kept.

The winding may contain 2·m·p coils, where p is the number of pole pairs and m is the number of phases, here m=3. The straight portion (the working section) of each coil leaves a void of approximately 120°/p in the inner contour and has a width of approximately 180°/p at the outer contour.

The coils 26 of one phase are wound with one continuous wire 27 so that two wire ends per phase leave the winding body 21. For a motor with three or more phases are six connections led to the outside. In comparison to coil assemblies where the ends of each single coil need to be connected, this leads to an easy and space-saving motor assembly, which is especially advantageous for small motors.

The stator can comprise 2 to 20 winding turns for each coil, advantageously between 4 and 8 winding turns for each coil. A small number of winding turns can be economically produced.

The stator 2 may have an inner radius $r_{ws}$ between 4 mm and 10 mm, advantageously between 6 mm and 8 mm. The stator lamination stack may have an outer radius $R_{sls}$ between 5 mm and 15 mm, advantageously between 10 mm and 12 mm.

A temperature sensor may be integrated in the stator 2. The sensor may be arranged between the winding head 23 or the winding body 21 and the stator lamination stack 22. The sensor may measure the temperature of the stator 2, at a point where the measured temperature is expected to best reflect the copper temperature during the operation of the motor. A controller may adjust the power of the motor to the measured temperature of the sensor.

The stator lamination stack 22 as a back iron can generate a higher magnetic flux density. The magnetic flux density depends on the material of the stator lamination stack 22 as well as the mechanical/geometric dimensioning as well as the electrical operating parameters such as current, voltage and the frequency of the motor during operation. Tests have shown that a magnetic flux density between 1 to 3 Tesla is an optimum value for this kind of motor.

As the torque of a motor is proportional to the product of the flux and the current, the rotor needs a sufficient outer radius $r_r=r_{ws}-\delta$ (where $\delta$ is the air gap height) to produce the permanently exited flux, and the stator lamination stack, $R_{sls}-r_{sls}$ needs to have a sufficient height to conduct the flux. The winding needs to have a sufficient active winding height$\approx r_{sls}-r_{ws}$ to allow for enough current, so that, with a given $R_{sls}$ and a given overall length $L_{Stator}$, the radii $r_{sls}$ and $r_{ws}$ can be chosen to optimise the motor constant. Moreover, the volume of the winding heads decreases with smaller active winding height, and the length of the winding heads $L_{wh}$ decreases with a larger thickness of the stator lamination stack $R_{sls}-r_{sls}$ at a given volume, leaving space for a longer active part. The optimisation of $r_{sls}$ and $r_{ws}$ leads to a certain ratio between the thickness of the stator lamination stack $R_{sls}-r_{sls}$ and the length $L_{wh}$ of each of the winding heads 23, 23' so that $(R_{sls}-r_{sls})/L_{wh}$ lies between 0.2 and 0.7; advantageously between 0.35 and 0.6.

In other words, the difference between the outer radius $R_{sls}$ and the inner radius $r_{sls}$ of the stator lamination stack 22 gives the radial thickness of the stator lamination stack 22.

A thick stator lamination stack 22 produces a higher mechanical stability for the stator lamination stack 22. In addition, more magnetic flux can be conducted in a thicker stator lamination stack 22, whereby a higher torque can be achieved with the motor. The winding heads 23, 23' have in a longitudinal direction a length $L_{wh}$. An axially short winding head 23, 23' allows a shorter and more compact motor. The ratio of the thickness of the stator lamination stack ($R_{sls}-r_{sls}$) to the length of the winding head $L_{wh}$ gives a quotient which is characteristic of a stator according to the invention.

The winding heads 23, 23' have a maximal thickness according to the differences between the outer radius of the stator lamination stack $R_{sls}$ and the inner radius of winding head $r_{wh}$. The axial length $L_{wh}$ of the winding heads 23, 23' should be as short as possible, so that the motor has a minimal axial length. The ratio of the difference between the outer radius $R_{wh}$ and the inner radius $r_{wh}$ of the winding heads 23, 23' and the axial length $L_{wh}$ of the winding head is between 0.5 and 1. In other words, the ratio of the thickness ($R_{wh}-r_{wh}$) of the winding heads 23, 23' and the axial length $L_{wh}$ of the winding heads 23, 23' is between 0.5 and 1.

The construction principles described above lead to a higher power density. For small motors, it is particularly more important to ensure a higher power density, because in many applications for example in the medical or robotic filed is there just a little space for motors and little mass allowed.

Advantageously, the electrically isolated wire used for building the coils of the winding body 21 is multi-stranded wire, as can be seen in the embodiment shown in FIG. 2, with individual insulated wires. The diameter of the wire strands may be for example 0.1 mm. Stranded wires decrease losses due to eddy currents. The increased flexibility of stranded wire compared to single-strand wire is also advantageous although not necessary for the manufacturing method according to the invention that will be discussed further below. After the coil forming winding process, the first winding head 23 has been pressed and formed into a ring shape with a flat front face 25.

The wire is advantageously coated with a lacquer that can be cured by heat, which allows a permanent mechanical stabilization of the winding body after the winding process by temporarily heating it to a certain temperature. The necessary heating may be achieved by conducting a sufficiently strong current through the wires for a short period of time, for heating up the wires, and thus also the winding body, to a temperature at which the lacquer coated is heat cured, resulting in a rigid polymer matrix into which the wire strands are embedded.

Similarly, the inner surface of the stator lamination stack 22 may be coated with a heat-curable lacquer, in order to permanently adhesively connecting it to the winding body.

Advantageously, the winding body and/or the stator lamination stack are at least partially covered by an electric insulation layer.

In the given embodiments, the winding body comprises three branches, each made out of one wire 27, each wire conducting the current of one of the three phases, each branch being composed of four coils, each wire has one connection 24 at each end of the wire 27. Advantageously the six connecting wires 24 are connected in a star connection. The phases may have a rotational offset of 120° to each other and/or an electrical offset of 120° to each other.

Figure 4:
FIG. 4 shows an exemplary embodiment of a winding tool according to the invention for manufacturing a stator, (a) in a perspective view of an upper part of the tool, (b) in a view along the longitudinal axis, (c) in a cross-sectional view along the plane A-A.
Figure 4:
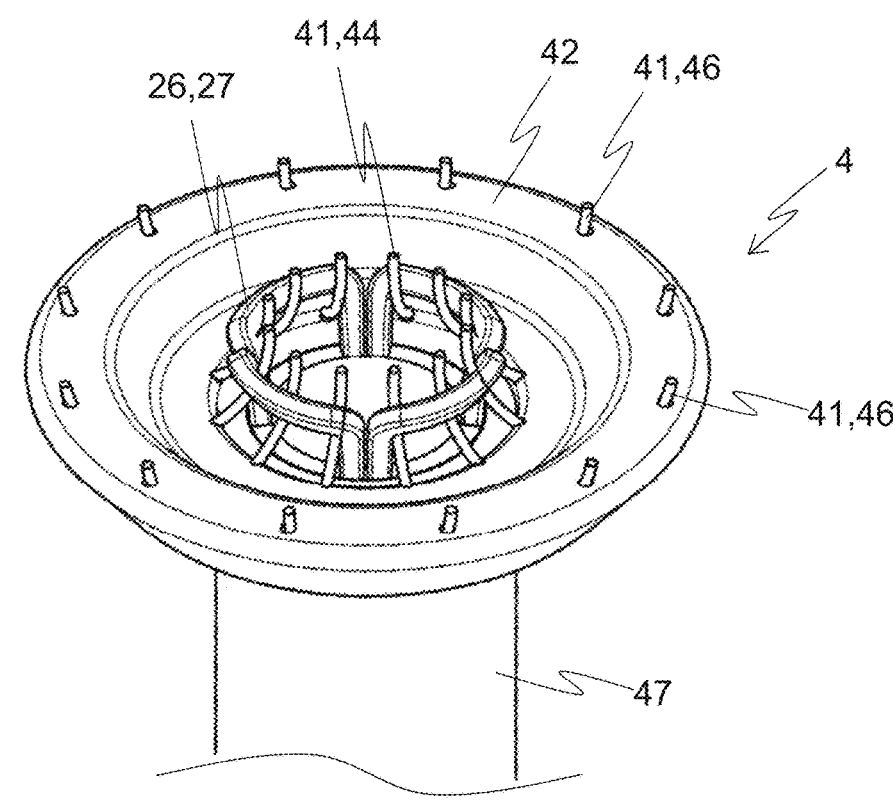
Figure 4:
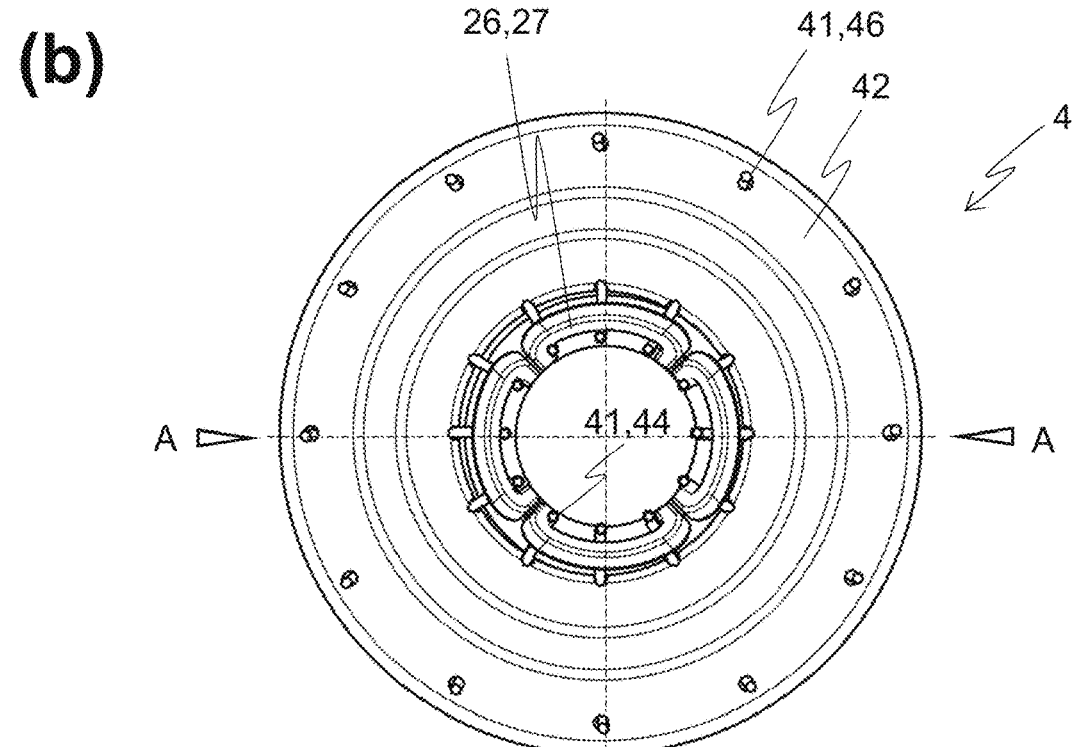
Figure 4:
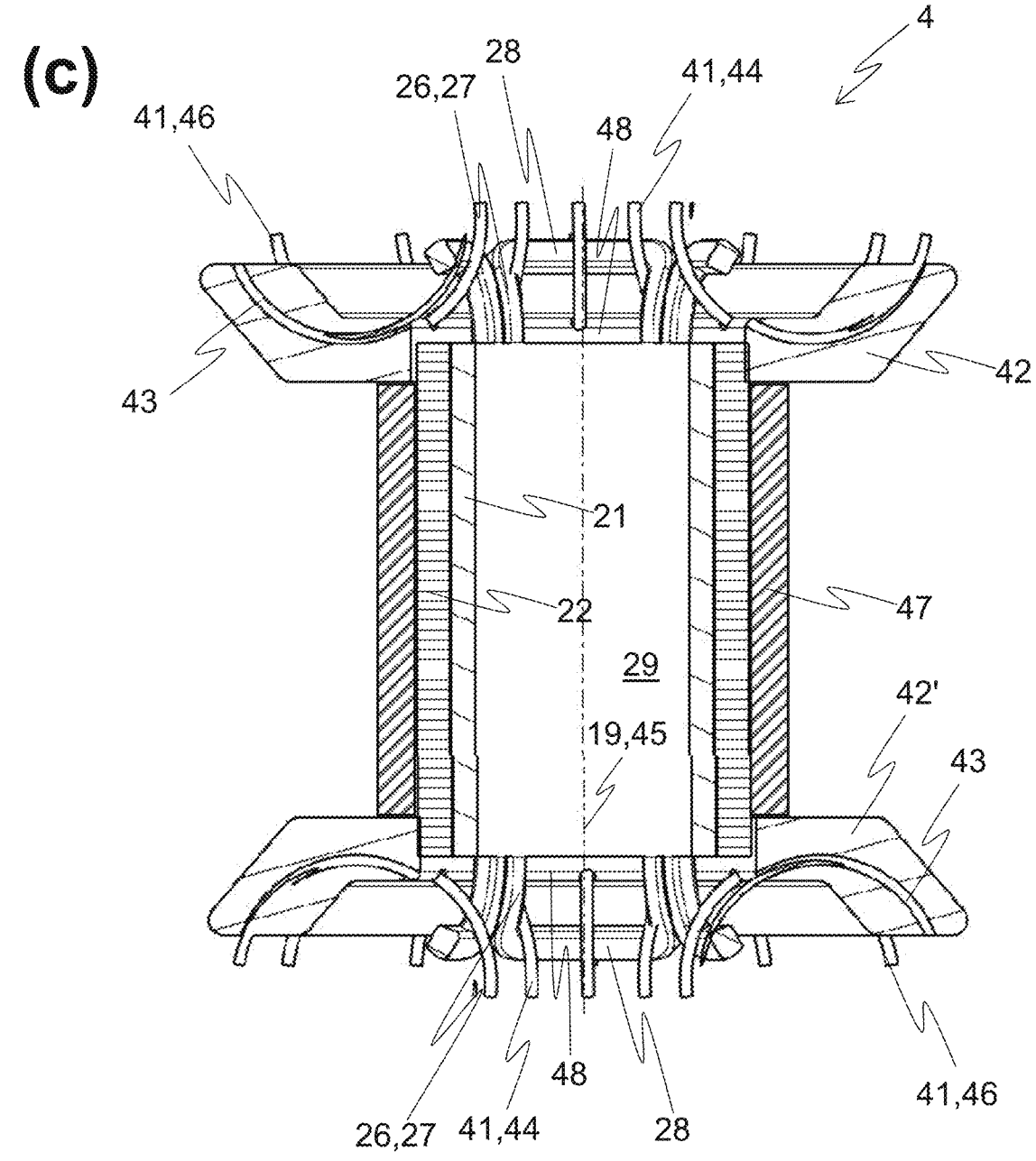

An advantageous winding tool 4 for manufacturing such stators is depicted in FIG. 4. The winding tool 4 comprises a first tool body 42, a second tool body 42', and an alignment cylinder 47 arranged between said two tool bodies 42, 42'.

FIG. 4 depicts the state where one branch consisting of four coils has been wound.

The tool bodies 42, 42' have a shape similar to a dish, with a central opening. Twelve curved guiding channels 43 are arranged around the rotational symmetry axis 45 of the tool 4. In each guiding channel a curved hook pin 41 is arranged. The guiding channels 43 and the hook pins have the shape of a circular arc, which allows to shift the hook pins 41 withing the guiding channels 43 between an operative position and a retracted position.

In FIG. 4, the hook pins 41 are in the operative configuration, in which the inner ends 44 of the hook pins 41 protrude from the tool body 42, 42'. In the retracted configuration (not shown), the inner hook pin ends 44 are located inside the tool body 42. The shift motion of the hook pins 41 within the channels 43 can be effected by suitable actuator mechanisms (not shown) coupled to the other, outer end 46 of the pins, for example by pneumatic actuators, linear motors, or gear racks.

For manufacturing a stator 2, a stator lamination stack 22 consisting of a stack of sheet iron rings, either as a single laminated body, or as a loose packet, is provided. The stator lamination stack 22 is hold in place in the alignment cylinder 47. A tool body is arranged 42, 42' on an under longitudinal end and on an upper longitudinal end of the alignment cylinder 47.

In the operative configuration in FIG. 4, which is used during the winding process of the coils 26 of the winding body 21, the protruding hook pins 41 hold the coil wires 27 in position, while the (in the given example four) coils 26 are wound up, one after another. The coil winding can be carried out with a suitable wire placement tool namely a needle winding tool. The needle winding tool (not shown) accesses the hook pins 41 of both tool bodies 42, 42' through the openings of the tool body 42, 42' and the interior compartment 29 of the stator 2 and places the insulated copper wire 27 in loops on the protruding hook pins 41 of the two tool bodies 42, 42'.

Figure 5:
FIG. 5 shows a partial view of a cross-section of another embodiment of a winding tool according to the invention for manufacturing a stator, during different stages of the manufacturing process (a) after winding the coils; (b) after retraction of the holding pins; (c) after insertion of a pressing tool; (d) after pressing the winding heads; (e) after removal of all tool parts and with only the stator left.
Figure 5:
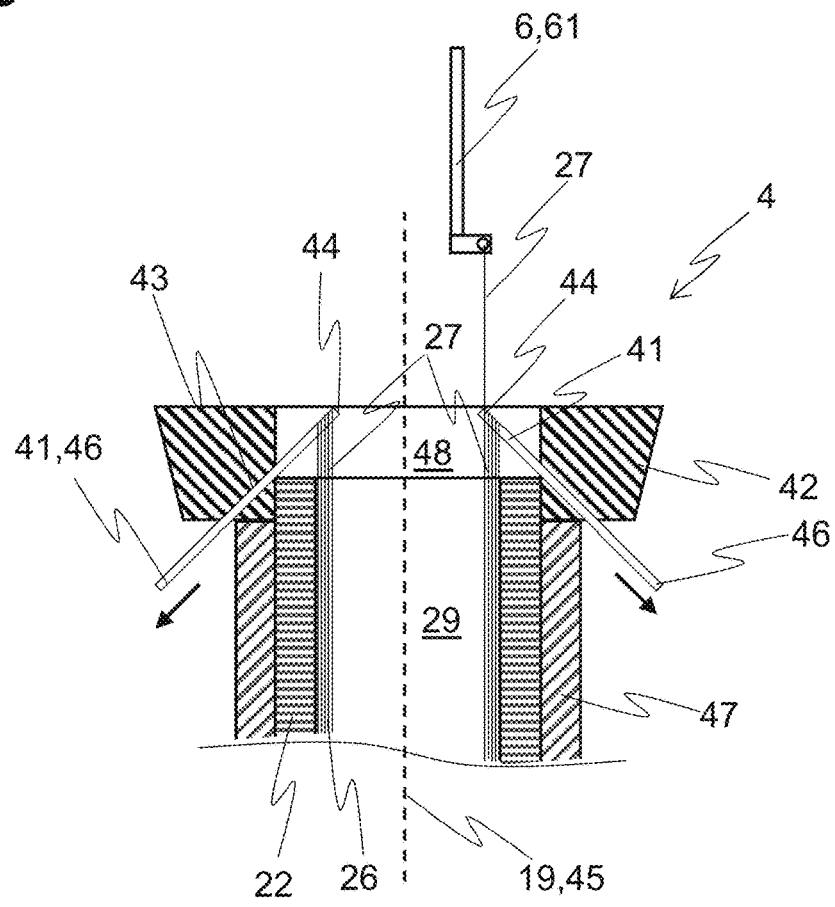
Figure 5:
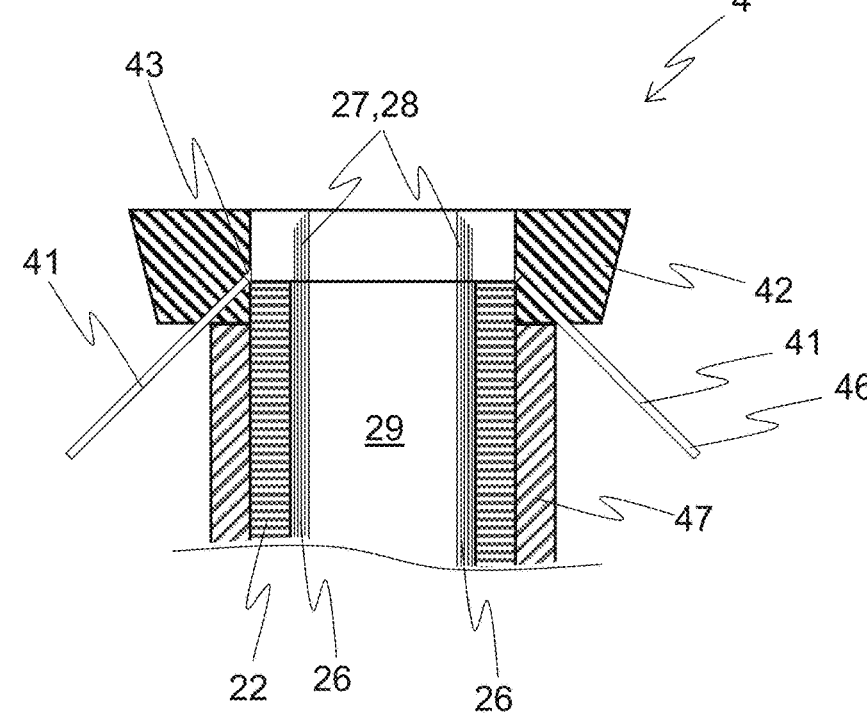
Figure 5:
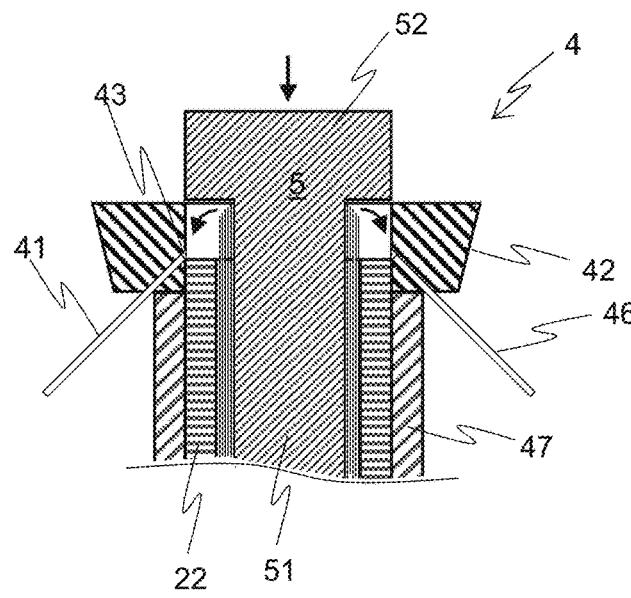
Figure 5:
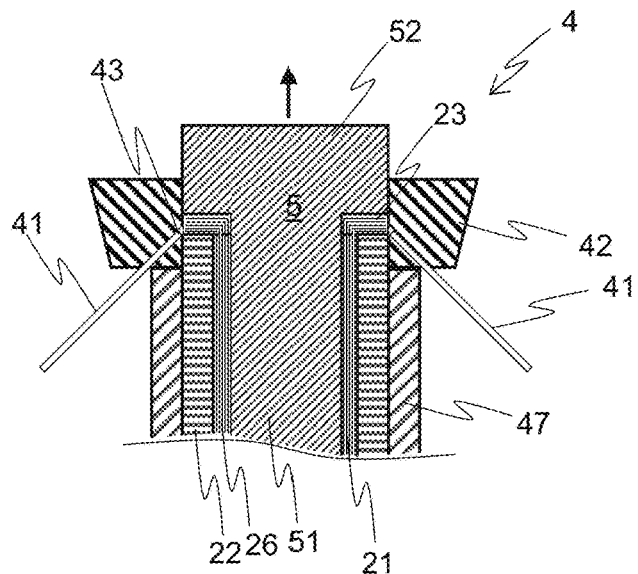
Figure 5:
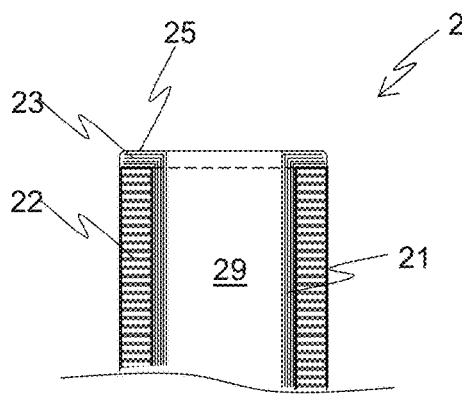

Another embodiment of an advantageous winding tool is shown in FIG. 5, during different stages of the manufacturing of a stator similar to the one discussed above. One longitudinal end of the stator with one tool body 42 is visible.

In FIG. 5(*a*), one tool body 42 of the winding tool is placed on the alignment cylinder 47. The stator lamination stack 22 of the future stator, in the form of a package of stacked sheet iron rings, is placed in the alignment cylinder 47 of the tool 4. The stator lamination stack 22 can be temporarily held in place by holding means (not shown), for example by suitably placed stoppers or clamps, or by magnetic holding means.

A multitude of hook pins is distributed along the circumference of the tool body 42, of which only two hook pins 41 are shown, for better readability of the figure. The hook pins 41 in the shown embodiment are linear and are arranged in guiding channels 43 in the tool body 42, which open into a cylindrical bore 48 of the tool body 42. The hook pins 41 are in the operative configuration, in which the inner ends 44 of the hook pins 41 are located so far toward the longitudinal axis 19, 45 that the wires can be looped around them. A wire dispense tool 6, of which a wire guiding needle 61 is schematically depicted, places multi-strand copper wire 27 in loops on the hook pins 41, thereby forming the coils 26 of the stator, which together will form the winding body 21.

During the winding process, depending on the inner end of the hook position at least the outlet point of the wire from the wire guiding needle 61 may move in an axial direction, so that the wire may laid over the inner end of the hook 44 respectively in a radial direction behind the hook 44. This is for example necessary to securely place the wire 27 over the inner end of the hook 44 respectively to bend the winding head 23 in a certain direction, advantageously in a radially outward direction. Then the wire guiding needle 61 moves in a circumference direction and places the wire over at least one further inner end of the hook 44. After laying the wire 27 behind the inner end of the hook 44, the wire guide needle 61 may move back in a radial direction to the longitudinal axis 19 and then be moved in axial direction through the cylindrical bore 48 to the other tool body 42' (not shown). At least the outlet point of the wire from the wire guiding needle 61 may be moved again in a radial direction away from the longitudinal axis 19 to lay the wire 27 over a next inner end of the hook 44 respectively in a radial direction behind the hook 44. Then the wire guiding needle 61 moves in a circumferential direction and places the wire over at least one further inner end of the hook 44. Thereafter the wire guide needle 61 may move back radially to the longitudinal axis 19 and back in an axial direction through the cylindrical bore 48 to the tool body 42. Then the winding process may be continued as previously described.

After finishing the winding process, the hook pins 41 are retracted to a retracted configuration, where the inner ends 44 of the hook pins 41 are located inside the guiding channels 43, as shown in FIG. 5(*b*). While the individual coils 26 inside the stator lamination stack 22 essentially form already the winding body, the longitudinal ends 28 of the formed coils 26 are still bulky.

The longitudinal ends 28 of the formed coils 26 are no longer supported by the hook pins 41 but are rigid enough to temporarily stay in place. Since during the winding process the wires 27, subject to a pulling force, have taken a configuration on the hook pins 41 where the length of the wire 27 is minimal under the given geometrical situation, the longitudinal ends 28 of the coils 26 radially extend outward over the inner radius $r_{sls}$ of the stator lamination stack 22 (not visible in in FIG. 5(*b*)), thereby temporarily positively locking the coils 26 in the stator lamination stack 22.

In a next step, a pressing tool 5 is inserted on both longitudinal ends 28, either simultaneously or separately. As schematically shown in FIG. 5(*c*), a pressing to comprises a guiding 51 and a pressing piston 52. The guiding piston 51 is inserted into the winding body 21 and the stator lamination stack 22. The guiding piston 51 ensures proper alignment of the pressing tool 5 with the winding tool 4 and locking the wires 27 inside the stator lamination stack 22 in place.

When the proximal end of the pressing piston 52 reaches the longitudinal ends 28 of the coils 26, it starts to exert a force on the wires 27 in the longitudinal direction toward the stator lamination stack 22. The wires 27 start to deform and spread radially outward and longitudinal against the stator lamination stack 22.

In the final position of the pressing tool 5, as depicted in FIG. 5(*d*), the longitudinal ends 28 of the coils 26 are firmly pressed in the toroidal press mould formed by the stator lamination stack 22, the tool body 42, the pressing piston 52 and the guiding rod 51, and take up the form of a circular flange, wherein the two winding heads 23, 23' positively lock the stator lamination stack 22 along a longitudinal axis 19 of the winding body by form-fit; The winding head 23 is formed.

Advantageously, the heat curable lacquer of the wires is hardened in this configuration, to fixate the wires 27 in their position. This can be achieved by temporarily direct a current through the coils 26 that heats the winding body 21 to the necessary curing temperature and keeps a predefined temperature-time profile until the curing has been completed. The wires 27 are now embedded in a dimensionally stable polymer matrix. The polymer matrix may contain thermoplastic or duroplastic or a mix of duroplastic and thermoplastic.

Alternatively, the curing step may also take place after the removal of the pressing tools 5. However, this is less advantageous, since the wires 27 are less compact in the finalized winding body.

For obtaining the finalized stator, the pressing tools 5, the two winding tool bodies 42, 42' and the alignment cylinder 47 are removed (see FIG. 5(e)).

The guiding rod 51 can also be used to radially compress the wires 27 within the stator lamination stack 22, thereby maximizing the inner diameter $r_{wh}$, $r_{ws}$ of the winding body 21 and increasing the contact between the wires 27 and the stator lamination stack 22. This allows to minimize the outer diameter of the motor for a given power output. The minimal airgap between the wires 27 and the stator lamination stack 22 increases the efficiency and the heat transport toward the stator lamination stack 22.

For this purpose, the guiding rod 51 may have a diameter that increases from the proximal tip toward the pressing piston 52, thereby compacting the wires 27 in the stator lamination stack 22 during insertion. Alternatively or in addition, the guiding rod 51 of the pressing tool 5 can be equipped with means to temporarily increase its diameter after insertion into the winding body 21, for example by inserting a wedge into a slot of the guiding rod 51, or with pneumatic means.

The area between guiding rod 51 and pressing piston 52 can be suitably modified to control the deformation of the wires 27. For example, the transition from the guiding rod 51 surface to the proximal face of the pressing piston can be realized as a curved surface, instead of two surfaces meeting at a rectangular angle, as in FIG. 5. Such an advantageous form allows to guide the wires 27 during deformation and reduces random deformation.

In another advantageous embodiment, the pressing tool 5 can be realized without a guiding rod, or with a shortened guiding rod 51 that is just long enough that during deformation, wires are hindered from deforming radially inwards.

It is also possible to compress the wires inside the stator lamination stack 22 in a separate step, with a separate tool, for example a pneumatically actuated balloon.

The wires 27 or the coils 26 may heated before the axial pressing with the pressing piston 52 and/or the radially pressing, so that the wires 27 and the insulation or a polymer coating the wires 27 or the coil 26 may become more flexible for the pressing process.

After the pressing process, when the winding body 21 has its final shape, the temperature may be additionally increased so that the polymer cures and fixes the wires 27 and coils 26 in place. The heating process can be carried out for example by a current that flows through the wire 27, and/or by heating the pressing tool 5.

The present invention is not to be limited in scope by the specific embodiments described herein. Indeed, various modifications of the present invention, in addition to those described herein, will be apparent to those skilled in the art from the foregoing description and accompanying drawings. Thus, such modifications are intended to fall within the scope of the appended claims. Additionally, various references are cited throughout the specification, the disclosures of which are each incorporated herein by reference in their entirety.

14

LIST OF REFERENCE NUMERALS

1 slotless electric motor
11, 11' ball bearing
12 casing
15 working section
18 sensor element
19 longitudinal axis
2 stator
21 winding body
22 stator lamination stack
23, 23' winding head
24 connecting wire
25, 25' front face of winding body
26 coil
27 wire
28 longitudinal end of coil
29 interior compartment
3 rotor
31 permanent magnet
32 shaft
33 protruding end of drive shaft
37 position encoder
4 winding tool
41 hook pin
42, 42' tool body
43 guiding channel
44 inner end of hook
45 rotational symmetry axis
46 outer end of hook
47 alignment cylinder
48 cylindrical bore
pressing tool
51 guiding rod
52 pressing piston
6 wire dispense tool
61 wire guiding needle
$R_{sls}$ outer radius of stator lamination stack
$r_{sls}$ inner radius of stator lamination stack
$R_{wh}$ outer radius of winding head
$r_{wh}$ inner radius of winding head
$r_{ws}$ inner radius of working section
$L_{wh}$, axial length of the winding head of the stator

The invention claimed is:

1. A stator for use in a slotless electric motor, the stator comprising:

a winding body in the form of a hollow cylinder, consisting of three or more coils, and having a working section located between two winding heads at two longitudinal ends of the winding body; and a cylindrical stator lamination stack, close-fittingly encompassing said working section of the winding body;

wherein said two winding heads consist of the longitudinal ends of the three or more coils;

wherein said two winding heads positively lock the stator lamination stack along a longitudinal axis of the winding body by form-fit;

wherein said two winding heads have the shape of a circular flange with an inner radius ($r_{wh}$) essentially or almost equal to an inner radius ($r_{ws}$) of the working section of the winding body; and wherein the two winding heads of the winding body have an outer radius ($R_{wh}$) essentially or almost equal to an outer radius ($R_{sls}$) of the stator lamination stack.

2. The stator according to claim 1, wherein a longitudinal front face of the two winding heads facing outward is oriented perpendicular to the longitudinal axis of the winding body.

3. The stator according to claim 1, wherein the coils forming the winding body are made with multi-strand wire.

4. The stator according to claim 3, wherein the multi-strand wire comprises a multi-strand copper wire.

5. The stator according to claim 1, wherein connecting wires of the different coils protrude in an axial direction in the middle of a longitudinal front face of the winding heads.

6. The stator according claim 1, wherein the ratio $(R_{wh}\text{-}r_{wh})/L_{wh}$ of the thickness $(R_{wh}\text{-}r_{wh})$ of a winding head and the axial length $L_{wh}$ of said winding head lies between 0.5 and 1.

7. The stator according to claim 1, wherein the ratio $(R_{sls}\text{-}r_{sls})/L_{wh}$ of the thickness $(R_{sls}\text{-}r_{sls})$ of the stator lamination stack and the length $L_{wh}$ of each of the winding heads lies between 0.2 and 0.7.

8. A slotless electric motor with a stator according to claim 1 and a rotor arranged within the interior compartment of said stator.

9. The electric motor according to claim 8, wherein a bearing and/or an encoder element and/or a balancing element of the rotor are positioned at least partially located within a winding head of the stator.

10. The stator according to claim 1, wherein the slotless electric motor comprises an electronically commutated motor.

11. The stator according to claim 1, wherein the ratio $(R_{sls}\text{-}r_{sls})/L_{wh}$ of the thickness $(R_{sls}\text{-}r_{sls})$ of the stator lamination stack and the length $L_{wh}$ of each of the winding heads lies between 0.35 and 0.6.

12. A tool for manufacturing a stator for use in a slotless electric motor, wherein the tool comprises:

a tool body with a central bore and a multitude of hook pins;

wherein said hook pins can be moved between a first, operative configuration and a second, retracted configuration;

wherein in said operative configuration of the hook pins, the inner ends of the hook pins protrude into the central bore of the tool body; and wherein in said retracted configuration of the hook pins, the inner ends of the hook pins are retracted, such that the distance of the inner ends of the hook pins from the longitudinal axis is larger than in the operative configuration.

13. The tool according to claim 12, wherein the slotless electric motor comprises an electronically commutated motor.

14. A method for manufacturing a stator for use in a slotless electric motor, comprising the steps:

providing a stator lamination stack of the stator, the stator lamination stack having the form of a hollow cylinder with an outer radius $(R_{sls})$ and a bore with an inner radius $(r_{sls})$;

providing a multitude of hook pins on one or both longitudinal ends of said stator lamination stack in a first configuration, the multitude of hook pins protruding toward a longitudinal axis of the stator lamination stack, and the inner ends of said hook pins having a distance from said longitudinal axis that is smaller than the outer radius $(R_{sls})$ of the stator lamination;

winding three or more wire coils across the bore of the stator lamination stack, the individual wires inside the bore being oriented essentially parallel to the longitudinal axis, and the individual wires on the longitudinal ends of the coils outside the stator lamination stack being placed on the multitude of hook pins;

moving the multitude of hook pins in a second configuration, in which said multitude of hook pins no longer support the individual wires; and compressing the wires on the longitudinal ends of the coils outside the stator lamination stack in a toroidally shaped winding head with an inner radius $(r_{wh})$ that is essentially equal to the inner radius $(r_{ws})$ of the coils inside the stator lamination stack.

15. The manufacturing method of claim 14, wherein the compressing step of the wires on the longitudinal ends of the coils outside the stator lamination stack of the stator is carried out with a toroidal press mould formed by a longitudinal front face of the stator lamination stack and one or more tool elements.

16. The manufacturing method of claim 14, wherein the wires inside the stator lamination stack of the stator are radially compressed against the inner surface of the stator lamination stack.

17. The manufacturing method of claim 14 wherein the wires coated with a heat curable prepolymer are used for winding the coils; and wherein after winding the coils and compressing the wires, said prepolymer is heat-cured, to form a mechanically stable winding body of the stator.

18. The manufacturing method of claim 14, wherein a manufacturing tool according to claim 10 is applied.

19. The method according to claim 14, wherein the slotless electric motor comprises an electronically commutated motor.

* * * * *